(12) United States Patent
Hyoi

(10) Patent No.: US 6,264,326 B1
(45) Date of Patent: Jul. 24, 2001

(54) WIRE-AND-THREAD RIMMED FRAME FOR EYEGLASSES

(76) Inventor: Isao Hyoi, 10-104, Itsuponden Fukusho, Maruoka-cho, Sakai-gun, Fukui-ken, 910-0251 (JP)

(*) Notice: Subject to any disclaimer, the term of this patent is extended or adjusted under 35 U.S.C. 154(b) by 0 days.

(21) Appl. No.: 09/512,218

(22) Filed: Feb. 24, 2000

(30) Foreign Application Priority Data

Feb. 26, 1999 (JP) ................................. 11-050448

(51) Int. Cl.[7] ........................................................ G02C 1/08
(52) U.S. Cl. ................................................................ 351/92
(58) Field of Search .................................. 351/90, 91, 92, 351/93, 94, 95, 103, 106, 111, 113, 154

(56) References Cited

U.S. PATENT DOCUMENTS 5,135,296 * 8/1992 Lindberg et al. ..................... 351/106
6,015,212 * 1/2000 Fortini .................................... 351/92

FOREIGN PATENT DOCUMENTS 11072752  3/1999 (JP).

* cited by examiner

Primary Examiner—George Manuel
(74) Attorney, Agent, or Firm—Arent Fox Kintner Plotkin & Kahn, PLLC

(57) ABSTRACT

Disclosed is an improved wire-and-thread rimmed frame structure for eyeglasses. It has a single wire so bent as to configure two opposite upper half-rims integrally connected by an intervening bridge and two lengths of high-tension thread each stretched round the lower circumference of one or the other lens to hold the lens in cooperation with the upper half rim. The single wire has a reentrant formed at each of the bridge-to-rim transitions, and it further comprises an arch-like bridge reinforcement, which is fixed to the bridge by hanging its opposite corners on the bridge-to-rim reentrants. Each length of high-tension thread is fixed at one end to one or the other support of the arch-like bridge reinforcement and at the other end to one or the other half frame, thereby allowing the length of high-tension thread to apply a stretch to one or the other support of the arch-like bridge as a counter action to the length of high-tension thread being stretched around the lower half circumference of the lens.

8 Claims, 6 Drawing Sheets

WIRE-AND-THREAD RIMMED FRAME FOR EYEGLASSES

BACKGROUND OF THE INVENTION

1. Field of the Invention

The present invention relates to a wire-and-thread rimmed frame for eyeglasses, which frame uses lengths of high-tension thread fixed to its upper wire half-rims to hold two lens in a pair of glasses.

2. Related Arts

A wire-and-thread rimmed frame has two lengths of high-tension thread fixed to its upper wire half-frames for holding the opposite lenses. Use of upper wire half-rims permits reduction of the eyeglass frame in weight and expansion of visual field. FIG. 9 shows a conventional wire-and-thread rimed frame structure. As shown, each semi-circular wire rim "a" has a length of high-tension thread "b" fixed to its opposite ends, thus enabling the lens "c" to be fixedly held within the wire-and-thread loop. The opposite upper half-rims "a" are jointed by the bridge "d", and each half-rim "a" has a joint piece "e" fixed to its outer edge. Each temple is hinged to one or the other half-rim "a" via the joint piece "e" so that the temple may be folded or unfolded relative to the front of the frame.

In order to expand the visual field a length of six millimeter-thick wire is used to form the upper half-rims "a". Each upper half-rim "a" is fitted in the groove made in the circumference of the lens "c". A length of high-tension thread such as nylon thread is fitted in the circumferential groove of the lens "c", too. That is to say the thickness of the wire is adjusted to the external diameter of the thread. Such wire which is thin enough to fit in the circumferential groove of the lens "c", however, can be hardly strong enough to provide an eyeglass frame for practical use. As the rim wire is fitted in the circumferential groove of the lens "c", some parts such as a bridge "d" connecting the opposite half-rims "a", joint pieces "e" for connecting temples to the half-rims and butterfly-wing pieces for connecting nose pads cannot be soldered to the rim wire, which is in the circumferential grooves of the opposite lenses.

In practice, each upper wire half-rim "a" has proximal and distal reinforcement pieces "f" soldered to its opposite sides. Then, the bridge "d" is soldered to the proximal reinforcement pieces "f" appearing on the circumferences of the opposite half-rims "a". Likewise, the joint pieces "e" are soldered to the distal reinforcement pieces "f" of the opposite wire half-rims. The proximal or distal reinforcement piece "f", however, has an increased strength, compared with the thin rim wire. Consequently the inner stress is likely to converge to the boundary "g" between the half-rim "a" and the proximal or distal reinforcement piece "f", resulting in the breaking of the eyeglass frame at these restricted places. As a matter of fact the rim wire was locally heated and softened when the proximal or distal reinforcement piece was soldered to the rim wire, thus reducing the strength of the rim wire at these restricted places. Sometimes, the lens "c" is unduly loaded there to cause cracks in the lens "c".

A length of high-tension thread "b" is inserted in two holes made in each of the proximal and distal reinforcement pieces "f" to be fixed thereto. Then, the length of high-tension thread "b" is stretched so that it may be caught and somewhat deformed by the circumferential edge "h" of each hole to be positively fixed to the reinforcement piece, as seen from FIG. 10 which shows Part "B" in FIG. 9 at an enlarged scale. As a result the length of high-tension thread "b" is liable to be broken there.

The same applicant as the present application filed a patent application on Aug. 25, 1997 in Japan (Japanese Patent 11-2752(A)), proposing that a length of high-tension thread has two loops formed at its opposite ends, thereby permitting the length of high-tension thread to be caught by the hook ends of the upper half-rim. There is no fear for causing any breaking in the length of high-tension thread. The length of high-tension thread is guaranteed to be free of loosing, and therefore, there is no fear of allowing the lens to slip off from the front of the eyeglass frame.

In the so proposed eyeglass frame, however, it is still necessary to solder a joint piece to the outer edge of each half-rim. Also, a nose pad attachment piece needs to be soldered to the inner edge of the half-rim. The soldering will cause the half-rim wire to be locally softened. Each temple is hinged to the joint piece, which is soldered to the half-rim. The temple is liable to be loosely fixed when the screws are loosened in the hinge.

SUMMARY OF THE INVENTION

One object of the present invention is to provide an improved wire-and-thread rimmed frame for eyeglasses, which eyeglass frame is free of the above described defects.

To attain this object a wire-and-thread rimmed frame according to the present invention is so designed that temples and other parts may be positively held in their assembling condition by making use of the stretching force which is originated from the stretched lengths of high-tension thread.

A wire-and-thread rimmed frame having a single wire so bent as to configure two opposite upper half-rims integrally connected by an intervening bridge and two lengths of high-tension thread each stretched round the lower circumference of one or the other lens to hold the lens in cooperation with the upper half rim, is improved according to the present invention in that; the single wire has a reentrant formed at each of the bridge-to-rim transitions of the single wire, and that it further comprises an arch-like bridge reinforcement, which is fixed to the bridge by hanging its opposite corners from the reentrants of the wire, each length of high-tension thread being fixed at one end to one or the other support of the arch-like bridge reinforcement, and at the other end to one or the other half-frame, thereby allowing the length of high-tension thread to apply a stretch to one or the other support of the arch-like bridge as a counter action to the length of high-tension thread being stretched around the lower half-circumference of the lens.

With this arrangement the arch-like bridge reinforcement, which gives a supplementary strength to the weakest portion of the single rim wire, is pulled down by the stretched lengths of high-tension thread, thus assuring that the reinforcement be prevented from coming off from the reentrants of the rim wire.

The curved top of the arch-like bridge reinforcement may be of an increased width to be applied to the nose.

The bridge reinforcement may have an extra leg integrally connected to each support, the extra leg having a nose pad attached to its end.

The bridge reinforcement may have its supports elongated and bent to form reentrants at their intermediate sections for fixing the lengths of thread, the elongated supports having nose pads attached to their ends.

A wire-and-thread rimmed frame having a single wire so bent as to configure two opposite upper half-rims integrally connected by an intervening bridge and two lengths of high-tension thread each stretched round the lower circumference of one or the other lens to hold the lens in cooperation with the upper half-rim, is improved according to the present invention in that; it further comprises two temples each foldably attached to one or the other half-rim and means for permitting the stretched lengths of high-tension thread to energize the temples at their pivot ends with the stretching force of the length of high-tension thread in direct or indirect way.

The temples are guaranteed to be free of coming off from the opposite half-rims by making use of the stretching force of the stretched lengths of high-tension of threads.

The means may comprise an inclined surface formed on the lateral extension of each half-rim or the end of each temple, thereby increasing or decreasing the stretching force applied to the length of high-tension thread in response to the unfolding or folding of the temple.

The means may comprise inclined counter surfaces formed both on the lateral extension of each half rim and on the end of each temple, thereby increasing or decreasing the stretching force applied to the length of high-tension thread in response to the unfolding or folding of the temple.

A wire-and-thread rimmed frame having a single wire so bent as to configure two opposite upper half-rims integrally connected by an intervening bridge and two lengths of high-tension thread each stretched round the lower circumference of one or the other lens to hold the lens in cooperation with the upper half-rim, is improved according to the present invention in that; each upper half-rim has a ring fixed to its outer edge, the ring having a cam surface formed on its top whereas each temple has a collared pivot fixed to its end, the collared-pivot having a counter cam surface formed on its bottom, the collared-pivot being rotatably fitted in the ring, and being so connected to the length of high-tension thread as to energize the rotary pivot with the stretching force of the length of high-tension thread.

Specifically each length of high-tension thread is fixed at one end to the collared pivot by inserting the terminal length of thread in the ring and the through hole of the collared-pivot and by making a knot at its end, or by inserting the terminal length of thread in the ring and by fixing to the bottom of the collared-pivot. Thus, the stretching force of the stretched length of high-tension thread is applied to the collared-pivot all the time, thereby assuring that the temple be smoothly folded or unfolded relative to the front without fear of loosening at its pivot.

Other objects and advantages of the present invention will be understood from the following description of wire-and-thread frames according to some preferred embodiments of the present invention, which are shown in accompanying drawings:

DETAILED DESCRIPTION OF PREFERRED EMBODIMENT

Figure 1:
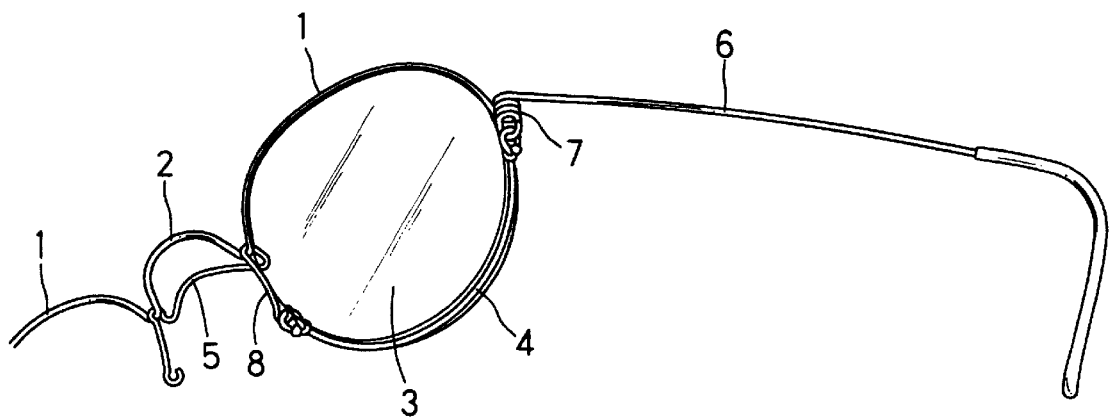
FIG. 1 is a perspective view of a wire-and-thread rimmed frame according to a first embodiment of the present invention.

Referring to FIG. 1, a wire-and-thread rimmed frame according to the first embodiment of the present invention comprises a single wire so bent as to configure two opposite upper half-rims 1 integrally connected by an intervening bridge 2, two lengths of high-tension thread 4, and an arch-like bridge reinforcement 5. Each length of high-tension thread 4 is stretched round the lower circumference of one or the other lens 3 to hold the lens 3 in cooperation with the upper half-rim 1. Specifically the length of high-tension thread 4 is fitted in the circumferential groove of the lens 3, and is fixed both to one or the other support 8 of the arch-like bridge reinforcement 5 and to the coiled spring 7 of one or the other temple 6. As shown in the drawing, the single wire has a reentrant section formed at each of the bridge-to-rim transitions, and the arch-like bridge reinforcement 5 is fixed to the bridge 2 by hanging its opposite corners from the reentrants of the wire.

Figure 2:
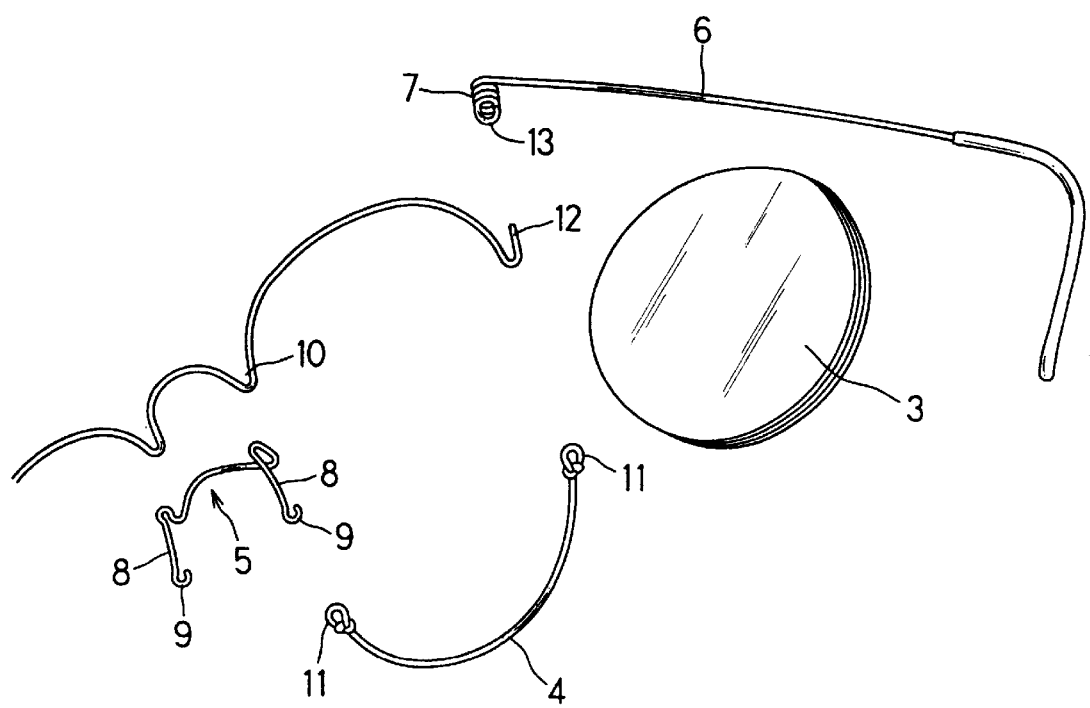
FIG. 2 is an exploded view of the wire-and-thread rimmed frame of FIG. 1.

Referring to FIG. 2, all parts can be assembled into a wire-and-thread rimmed frame without being soldered or using screws, and can be held in assembling condition simply by making use of the stretching force of the lengths of high-tension thread 4. As seen from the drawing, the arch-like bridge reinforcement 5 has hooks 9 formed at its opposite supports 8. The arch-like bridge reinforcement 5 rides on the bridge 2 with its opposite 15 supports 8 hanging from the opposite bridge-to-rim reentrant transitions 10, and the loop knot 11 of each length of high-tension thread 4 is caught by the hook 9 of one or the other support 8. The stretching of each length of high-tension thread 4 will cause the opposite supports 8 of the arch-like bridge reinforcement 5 to be pulled down, thus permitting the arch-like bridge reinforcement 5 to be fixed to the bridge 2 in stable condition.

As seen from FIG. 2, each half-rim 1 has an upright pivot axle 12 formed at its end whereas the coiled spring 7 of each temple 6 has a hook 13 formed at its end. The temple 6 is rotatably fixed to the half-rim 1 by inserting the upright pivot axle 12 in the coiled spring 7 of the temple 6, allowing the hook 13 to catch the loop 11 of the length of high-tension thread 4. As described above, the length of high-tension thread 4 is tied to the hook 9 of one or the other support of the arch-like bridge reinforcement 5. Thus, the stretched length of high-tension thread round the lower circumference of the lens 3 prevents the arch-like bridge reinforcement 5 from coming off from the bridge-to-rim reentrant transitions 10, and at the same time, the coiled spring 7 of the temple 6 from coming off from the pivot axle 12 of the half-rim 1.

The temple 6 can be unfolded relative to the front to stay at the angular position at which the hook end of the coiled spring 7 of the temple 6 abuts against the base of the upright pivot axle 12. The temple 6 can be yieldingly twisted to expand even wider as is the case with the hinged temple, thus permitting the eyeglasses to fit snugly on the head.

The wire-and-thread rimmed frame can be worn on the face by allowing the bridge 2 to ride on the nose, thereby supporting the front stably. The anti-bending strength of the bridge 2 can be increased by the arch-like bridge reinforcement 5, and the deformation of the bridge 2 can be reduced to minimum when the temples 6 are unfolded relative to the front to wear the eyeglasses.

Figure 3A:
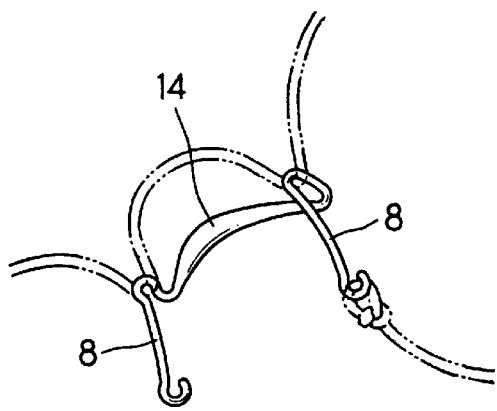
FIGS. 3(a), (b) and (c) illustrate different arch-like bridge reinforcements.
Figure 3B:
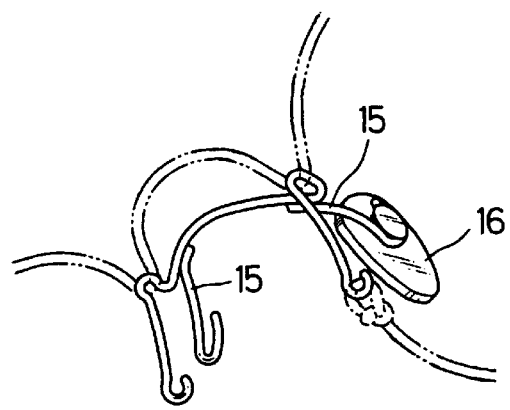
Figure 3C:
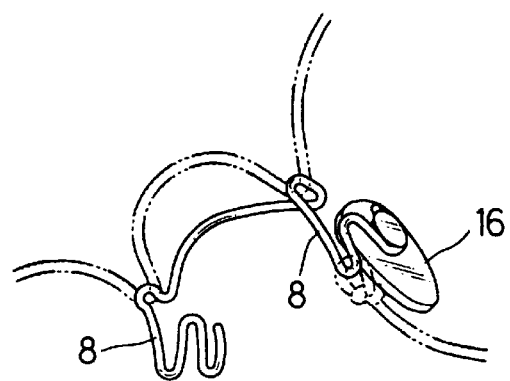

Referring to FIG. 3, the arch-like bridge reinforcement 5 has a curved top of an increased width 14 to be applied to the nose, thereby giving a pleasing touch to the eyeglasses wearer (FIG. 3a); the arch-like reinforcement 5 has an extra leg 15 soldered to each support 8, the extra leg 15 having a nose pad 16 attached to its end (FIG. 3b); and the bridge reinforcement 5 has its supports 8 elongated and bent to form reentrants at their intermediate sections for fixing one ends of the lengths of high-tension thread, the elongated supports having nose pads 16 attached to their ends (FIG. 3c).

Figure 4:
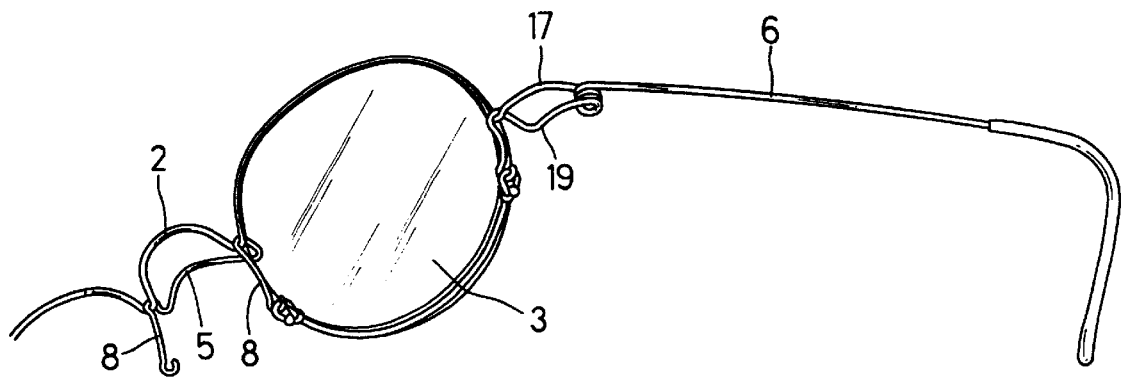
FIG. 4 is a perspective view of a wire-and-thread rimmed frame according to a second embodiment of the present invention.
Figure 5:
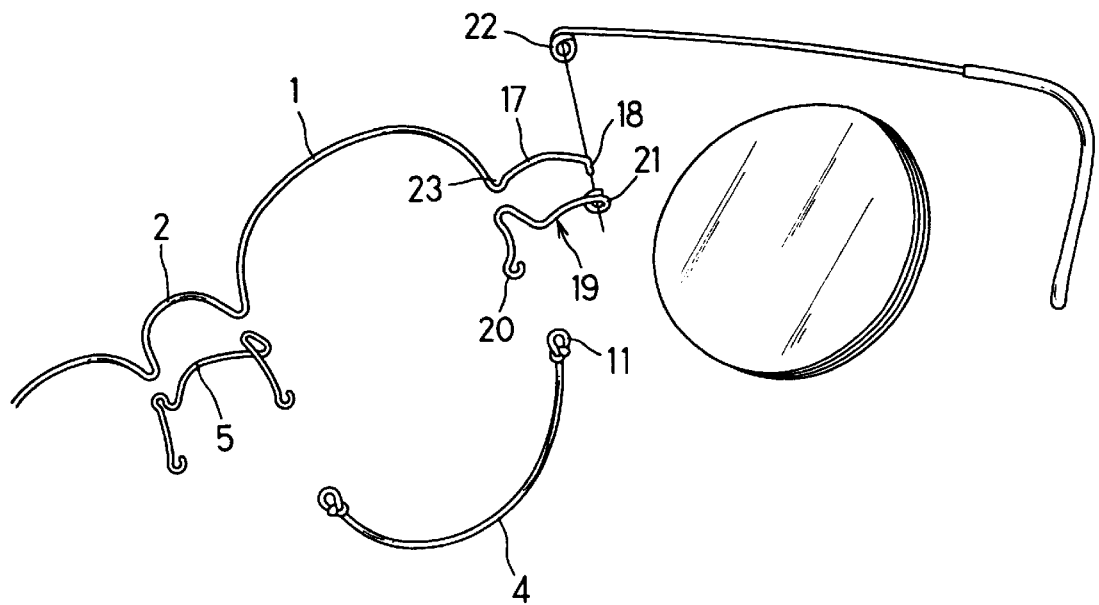
FIG. 5 is an exploded view of the wire-and-thread rimmed frame of FIG. 4.

FIG. 4 shows a wire-and-thread rimmed frame according to the second embodiment of the present invention, and FIG. 5 shows the wire-and-thread frame in exploded condition. The frame of FIGS. 4 and 5 is different from that of FIGS. 1 and 2 only in the manner in which each temple 6 is attached to the front. As shown, each half-rim 1 has a lateral extension to form a joint piece 17. The joint piece 17 thus formed has a dependent pivot axle 18. An L-shaped engagement piece 19 is used to fix the temple 6.

As shown, the L-shaped engagement piece 19 has a hook formed on one end, and a ring 21 formed at the other end. The temple 6 has a ring 22 formed at its end. The pivot axle 18 of the lateral extension 17 is inserted in the ring 22 of the temple 6. The L-shaped engagement piece 19 is engaged with the half-rim 1 by hanging from the rim-to-joint reentrant transition 23 and by inserting the pivot axle 18 in the ring 21 of the L-shaped engagement piece 19. Then, the loop 11 of the stretched length of high-tension thread 4 is caught by the hook 20 of the L-shaped engagement piece 19 to pull down the hook end of the engagement piece 19, thereby causing a rotary moment about the rim-to-joint reentrant transition 23 to permit the ring 22 of the L-shaped engagement piece 19 to push the ring 22 of the temple 6 against the base of the pivot axle 18, thus preventing the ring 22 of the temple 6 from coming off from the pivot axle 18 of the lateral extension 17.

Figure 6:
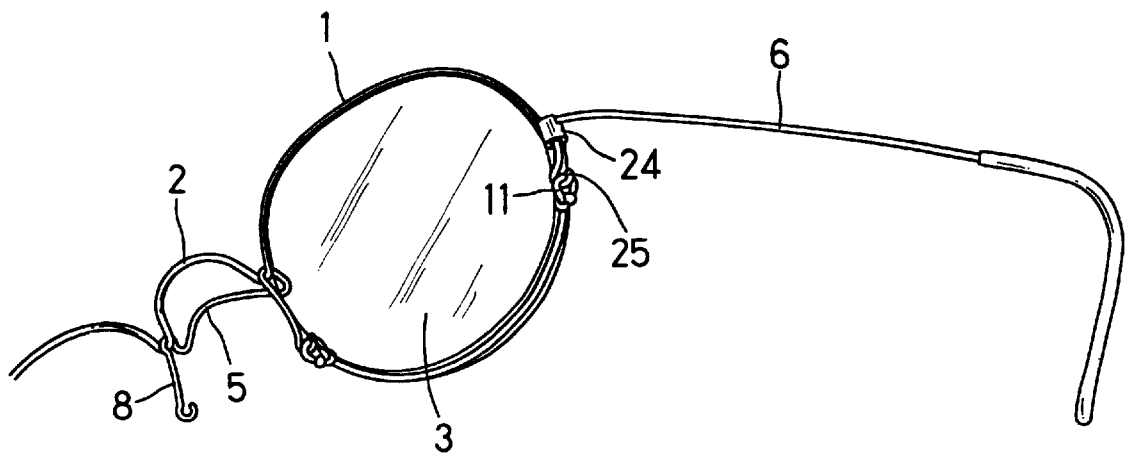
FIG. 6 illustrates one example of temple joint.

Referring to FIG. 6, a wire-and-thread rimmed frame has an arch-like bridge reinforcement 5 hung from the reentrants at the opposite bridge-to-rim transitions as in the wire-and-thread frames as described above, but each half-rim 1 has a tube or pipe 24 soldered to its outer edge. Each temple 6 has a hooked end bent at right angle, and the hooked end is inserted in the pipe 24 to project the hook 25 from the lower end of the pipe 24. The loop 11 of the length of high-tension thread is caught by the hook 25 of the hooked end of the temple 6.

Figure 7A:
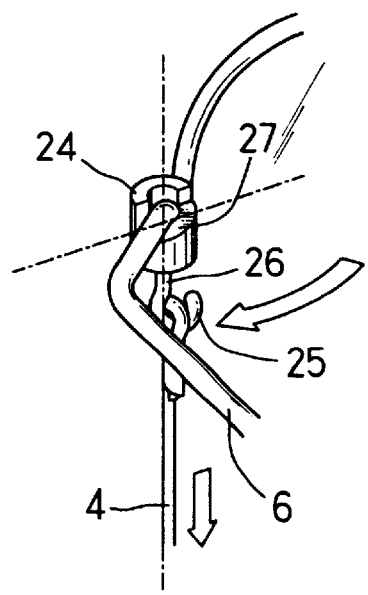
FIGS. 7(a) and (b) illustrate another example of temple joint.
Figure 7B:
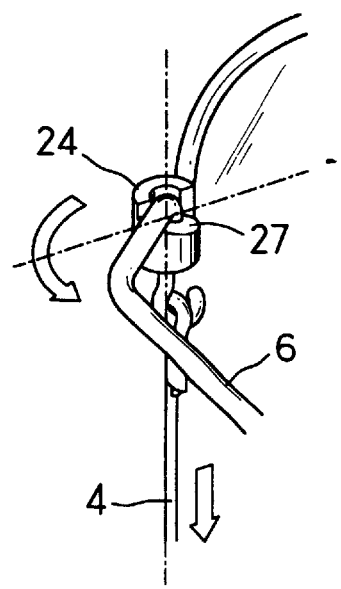

FIG. 7 shows another examples of temple joint, each of which comprises a circular cylinder 24 having an inclined spiral surface 27 formed on one half side. The hooked end 26 of the temple is pulled down by the length of high-tension thread 4 to push the temple 6 against the inclined spiral surface 27. Thus, the temple 6 is allowed to be automatically unfolded by moving it on the inclined spiral surface 27 as indicated by arrow in FIG. 7a whereas the temple 6 is allowed to be automatically folded by moving it on the inclined spiral surface 27 as indicated by arrow in FIG. 7b. In this latter case the opposite temples 6 are biased inward all the time, thereby assuring the close fitting on the opposite sides of the head to hold the eyeglasses on the face in stable condition.

FIG. 8 shows still another example of temple joint, which comprises two counter cams 28 and 29 fixed to the half-rim 1 and the temple 6 respectively. Specifically the half-rim 1 has a ring bearing 28 soldered to its outer edge. The ring bearing 28 has a cam 31 formed on its top. The temple 6 has a hollow collared pivot axle 29 soldered to its end. The hollow collared pivot axle 29 has a through hole made therein, and it has a counter cam 32 formed on its collar-to-pivot transition. FIG. 8(a) shows the hollow collared pivot axle apart from the ring bearing 28. As shown, the length of high-tension thread 4 is inserted in the ring bearing 28 and the hollow collared pivot axle 29, and a knot 11 is made at the end of the length of high-tension thread 4.

Figure 8A:
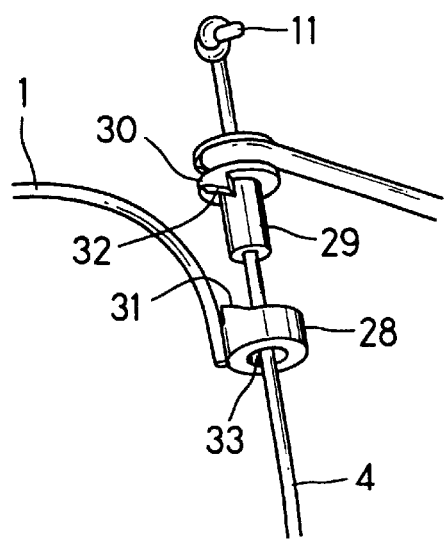
FIGS. 8(a), (b), (c) and (d) illustrate still another example of temple joint.
Figure 8B:
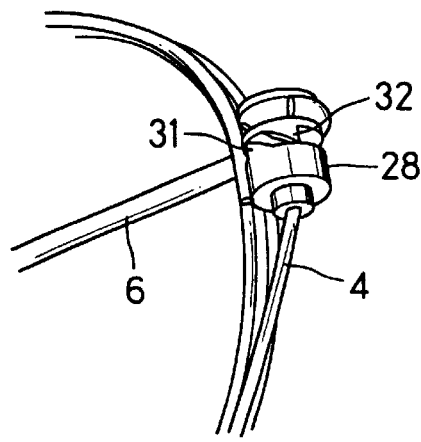
Figure 8C:
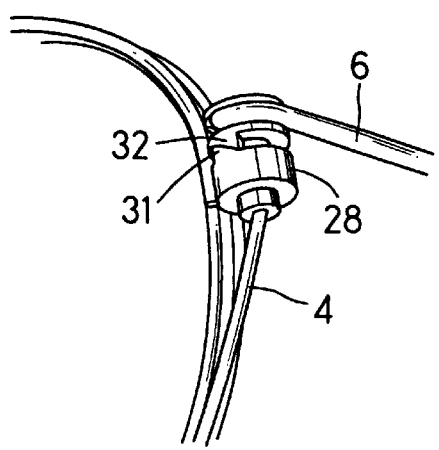
Figure 8D:
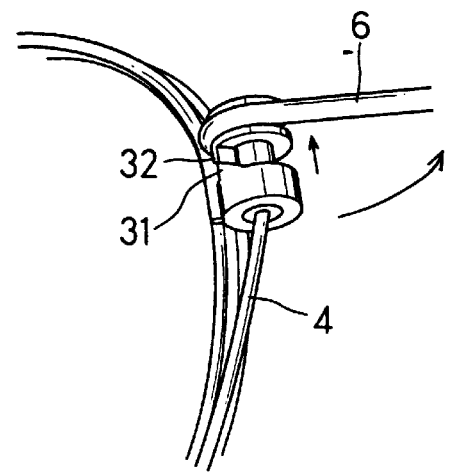
Figure 9:
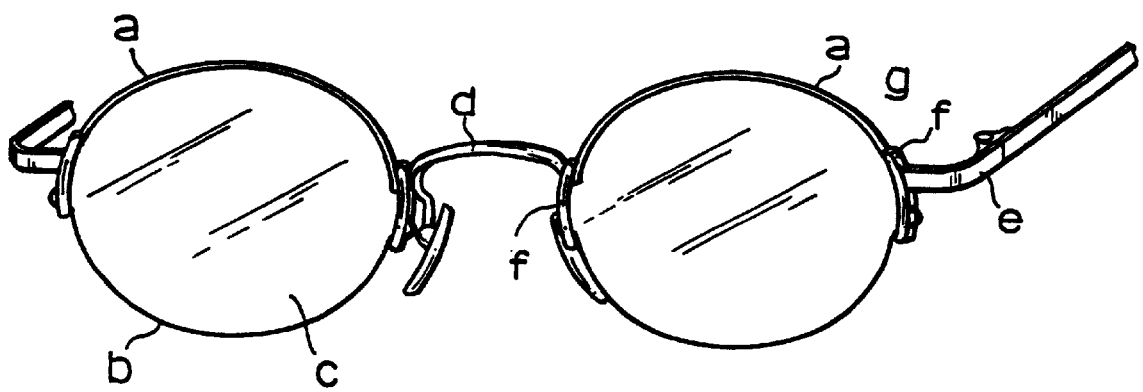
FIG. 9 is a perspective view of a conventional wire-and-thread rimmed frame.
Figure 10:
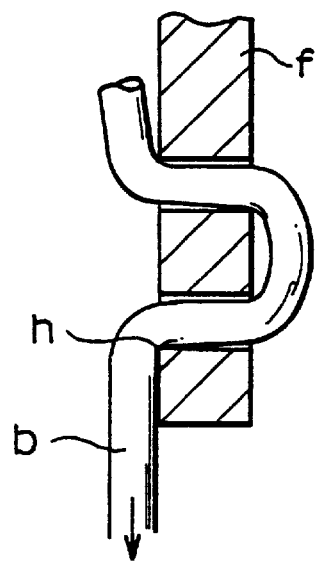
FIG. 10 illustrate the manner in which the length of high-tension thread is caught and fixed to the half-rim.

The collared pivot axle 29 is rotatably fitted in the ring bearing 28, and their cams 31 and 32 are put in mating condition by pulling down the length of high-tension thread 4. FIG. 8b shows that the temple 6 is folded whereas FIG. 8c shows that the temple 6 is unfolded. FIG. 8d shows that the temple 6 is unfolded beyond certain angular limit. The length of high-tension thread 4 is stretched all the time to pull the pivot axle 29 in the ring 28, thereby pushing the upper cam 32 against the lower cam 31. The upper cam 32 slides on the lower cam 31 while the temple 6 is folded or unfolded.

When the temple 6 is unfolded beyond certain angular limit (FIG. 8d), the pivot axle 29 is raised while the lower and upper cams 31 and 32 are mated together. As a result, the length of high-tension stretch 4 is increasingly stretched, and accordingly an increased pulling force is applied to the pivot axle 29, thereby causing an increased folding force to be applied to the temple 6. Thus, the temple joint functions like a hinge.

As may be understood from the above, a wire-and-thread rimmed frame according to the present invention assures that the lenses be fixedly held by the stretching force, which are applied to the lengths of high-tension thread without fear of cutting the stretched lengths of thread at the hole edges by which they are caught in fixing to the upper half-wire rims. A single wire is so bent as to configure the front of the eyeglass frame, which has an arch-like bridge reinforcement hung from the opposite reentrants of the bridge of the front, thus increasing the strength of the front.

Each temple can be folded and unfolded from the front without recourse to any hinge joints, and the stretched length of high-tension thread gives a pull to the temple all the time, thus preventing the temple from being loose at the temple-to-rim joint. In spite of the simple joint structure the temple can be stable in folding or unfolding position; the temple-to-rim joint is energized with the stretching force from the length of high-tension thread all the time. The temple pivot having an inclined cam surface formed therein is responsive to the folding or unfolding of the temple for decreasing or increasing the stretching force, thereby applying a pleasing force to restore the temple toward its normal unfolding position. No soldering is required in assembling parts, and therefore, no deterioration may be caused in the wire material.

What is claimed is:

1. A wire-and-thread rimmed frame for eyeglasses having a single wire so bent as to configure two opposite upper half-rims integrally connected by an intervening bridge and two lengths of high-tension thread each stretched round the lower circumference of one or the other lens to hold the lens in cooperation with the upper half-rim characterized in that; the single wire has a reentrant formed at each of the bridge-to-rim transitions of the single wire, and that it further comprises an arch-like bridge reinforcement, which is fixed to the bridge by hanging its opposite corners from the reentrants of the wire, each length of high-tension thread being fixed at one end to one or the other support of the arch-like bridge reinforcement and at the other end to one or the other half-frame, thereby allowing the length of high-tension thread to apply a stretch to one or the other support of the arch-like bridge as a counter action to the length of high-tension thread being stretched around the lower half-circumference of the lens.

2. A wire-and-thread rimmed frame for eyeglasses according to claim 1, wherein a curved top of the arch-like bridge reinforcement is of an increased width to be applied to a nose.

3. A wire-and-thread rimmed frame for eyeglasses according to claim 1, wherein the bridge reinforcement has an extra leg integrally connected to each support, the extra leg having a nose pad attached to its end.

4. A wire-and-thread rimmed frame for eyeglasses according to claim 1, wherein the bridge reinforcement has its supports elongated and bent to form reentrants at their intermediate sections for fixing the lengths of thread, the elongated support having nose pads attached to their ends.

5. A wire-and-thread rimmed frame for eyeglasses having a single wire so bent as to configure two opposite upper half-rims integrally connected by an intervening bridge and two lengths of high-tension thread each stretched round the lower circumference of one or the other lends to hold the lens in cooperation with the upper half-rim characterized in that; it further comprises two temples each foldably and directly attached to one or the other half-rim and means for permitting the stretched lengths of high-tension thread to energize the temples at their pivot ends and to prevent the temples from detaching from the half-rims using the stretching force of the length of high-tension thread in direct or indirect way.

6. A wire-and-thread rimmed frame for eyeglasses according to claim 5, wherein the means comprises an inclined surface formed on the lateral extension of each half-rim or the end of each temple, thereby increasing or decreasing the stretching force applied to the length of high-tension thread in response to the unfolding or folding of the temple.

7. A wire-and-thread rimmed frame for eyeglasses according to claim 5, wherein the means comprises inclined counter surfaces formed both on the lateral extension of each half-rim and on the end of each temple, thereby increasing or decreasing the stretching force applied to the length of high-tension thread in response to the unfolding or folding of the temple.

8. A wire-and-thread rimmed frame for eyeglasses having a single wire so bent as to configure two opposite upper half-rims integrally connected by an intervening bridge and two lengths of high-tension thread each stretched round the lower circumference of one or the other lens to hold the lens in cooperation with the upper half-rim characterized in that; each upper half-rim has a ring fixed to its outer edge, the ring having a cam surface formed on its top whereas each temple has a collared pivot fixed to its end, the collared-pivot having a counter cam surface formed on its bottom, the collared-pivot being rotatably fitted in the ring, and being so connected to the length of high-tension thread as to energize the rotary pivot with the stretching force of the length of high-tension thread.

\* \* \* \* \*